United States Patent [19]
Devenyi

[11] Patent Number: 5,546,238
[45] Date of Patent: Aug. 13, 1996

[54] ZOOM LENS HAVING HIGH SPEED MULTI-LENS DRIVE

[75] Inventor: Gabor Devenyi, Ontario, Canada

[73] Assignee: Hughes Aircraft Company, Los Angeles, Calif.

[21] Appl. No.: 105,698

[22] Filed: Aug. 11, 1993

[51] Int. Cl.⁶ .............................. G02B 7/02; G02B 15/14
[52] U.S. Cl. .......................... 359/823; 359/694; 359/696; 359/813
[58] Field of Search ..................... 359/676, 685, 359/694–700, 813, 823, 824, 814, 223–227; 310/317, 323, 331, 332, 81, 328; 354/195.1

[56] References Cited

U.S. PATENT DOCUMENTS

| | | | |
|---|---|---|---|
| 4,303,324 | 12/1981 | Marcus | 359/824 |
| 5,016,993 | 5/1991 | Akitake | 359/696 |
| 5,170,089 | 12/1992 | Fulton | 359/813 |
| 5,289,318 | 2/1994 | Sekine et al. | 359/813 |
| 5,293,268 | 3/1994 | Ihara et al. | 359/696 |

*Primary Examiner*—Thong Q. Nguyen
*Attorney, Agent, or Firm*—Michael W. Sales; Wanda K. Denson-Low

[57] ABSTRACT

A high speed zoom lens arrangement (2) including a plurality of lens elements (4,5), each being disposed along a common optical path (3). The zoom arrangement has a single optical drive (40) and piezoelectric clamps (10, 11, 20, 21), associated with each lens for selectively connecting each lens (4, 5) to the optical element drive (40). The arrangement moves the lenses (4, 5) along the common optical path (3) to change the focal length or the magnification of the arrangement (2).

20 Claims, 5 Drawing Sheets

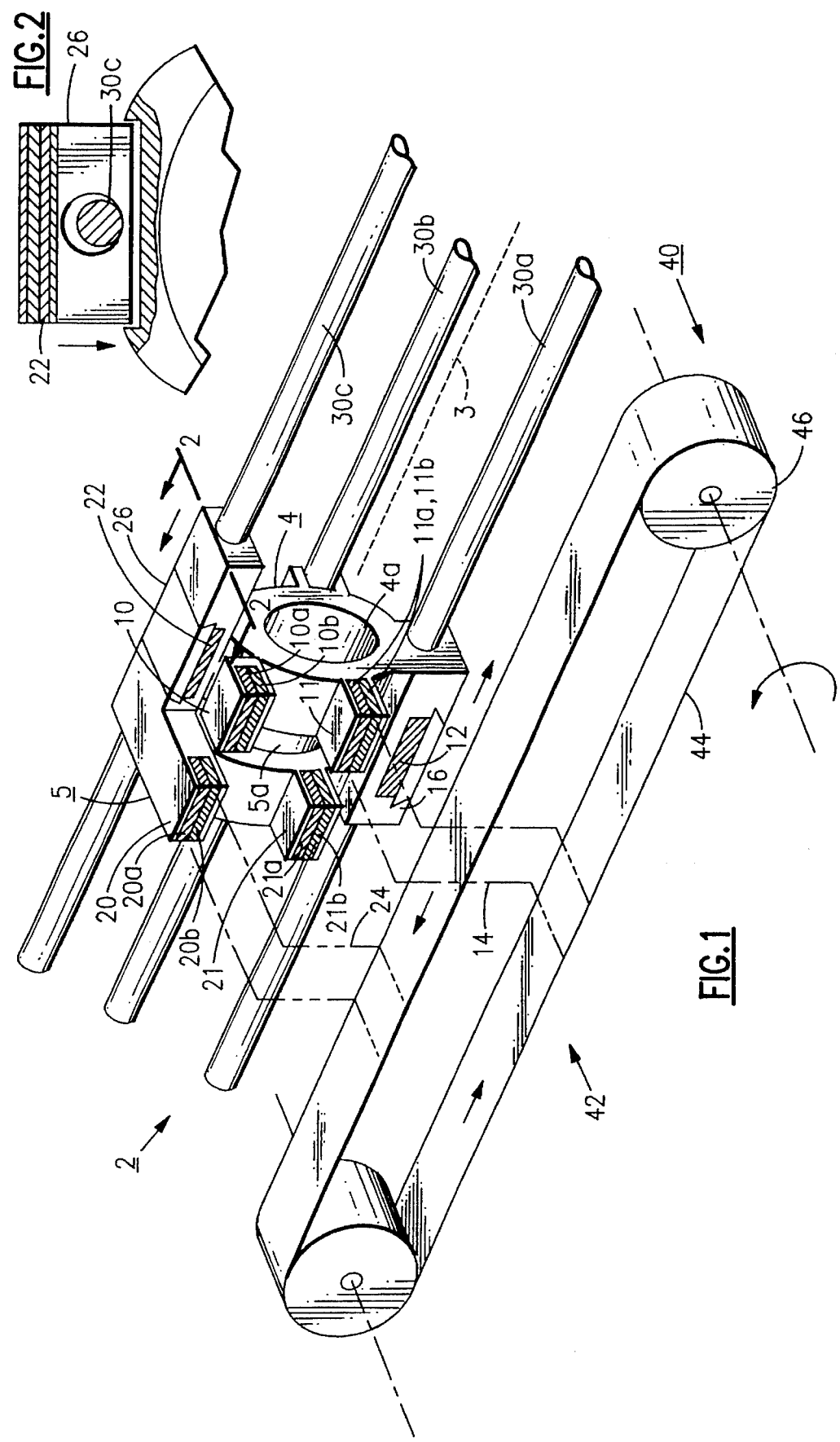

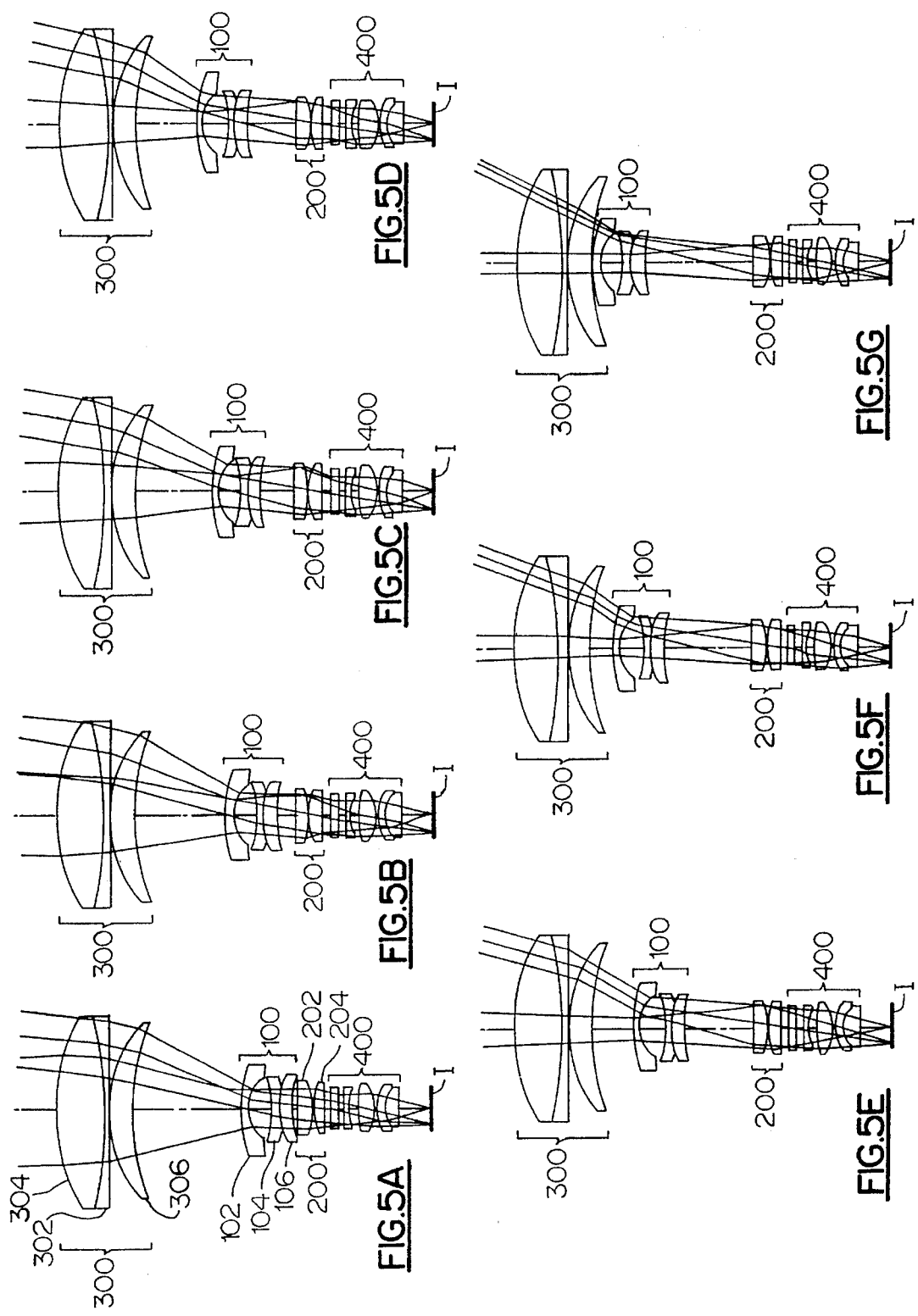

5,546,238

ZOOM LENS HAVING HIGH SPEED MULTI-LENS DRIVE

BACKGROUND OF THE INVENTION

The present invention relates to a zoom lens and, in particular, relates to one such zoom lens having a high speed multi-lens drive.

Conventional zoom lenses typically include stepper or DC motors with a rotary optical encoder and lead screw combination dedicated to each individual lens drive, i.e., each zoom lens and each focusing lens. The resolution of this system is set by the combination of the number of steps produced in one revolution and the pitch of the lead screw. In addition, the high resolution requirement tends to limit the speed. In such a system the resolution is limited, as well as being difficult to miniaturize due to the multi-motor arrangement. Consequently, it is highly desirable to provide a zoom lens that substantially overcomes the above-recited disadvantages of the conventional zoom lenses.

SUMMARY OF THE INVENTION

Accordingly, it is one object of the present invention to provide a zoom lens with a simultaneous multi-lens drive.

This object is accomplished, at least in part, by an optical apparatus comprising a plurality of discrete optical elements, each being disposed along a common optical path; a single optical element drive means; and means, associated with each optical element, for selectively connecting said plurality of discrete optical elements to said single optical element drive means, to move said plurality of discrete optical elements along said common optical path to change the focal length or magnification of the optical apparatus.

One important advantage of the invention is that it can simultaneously position more than one selected lens element with only one drive motor.

Other objects and advantages of the present invention will become apparent to those skilled in the art from the following detailed description of the invention when read in conjunction with the appended claims and drawings attached hereto.

BRIEF DESCRIPTION OF THE DRAWING

The drawing, not drawn to scale, includes:

FIG. 1 shows a perspective view of a zoom lens embodying the principles of the present invention.

FIG. 2 shows a cross-section view through lines 2—2 in FIG. 1;

FIG. 5(a) through 5(g) show lens diagrams of a zoom lens.

DETAILED DESCRIPTION OF THE INVENTION

Figure 3A:
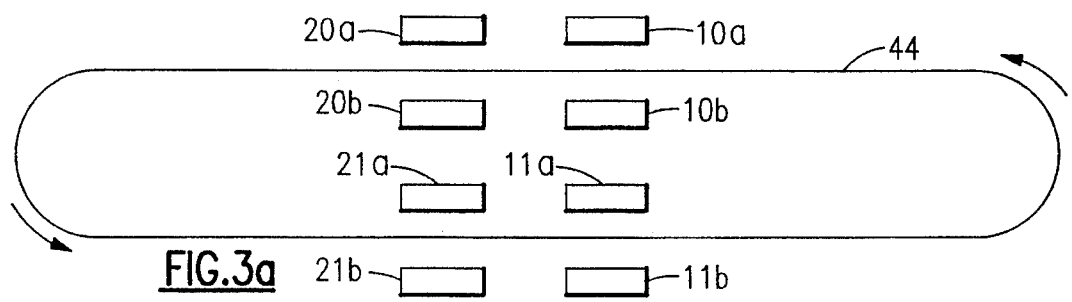
FIGS. 3(a)-3(j) each show a cross section view along section line 3—3 in FIG. 1.

An optical apparatus generally indicated at 2 in the drawing and embodying the principles of the present invention, includes a plurality of discrete optical elements 4, 5, each being disposed along a common optical path 3; and a single optical element drive means 40. The optical apparatus 2 also includes selectively connecting means 10, 11, 20, for selectively connecting the plurality of discrete optical elements 4, 5 to the single optical element drive means 40 to move the plurality of discrete optical elements 44, 5 along the common optical path 3 to change the focal length or magnification of the optical apparatus 2.

Figure 4:
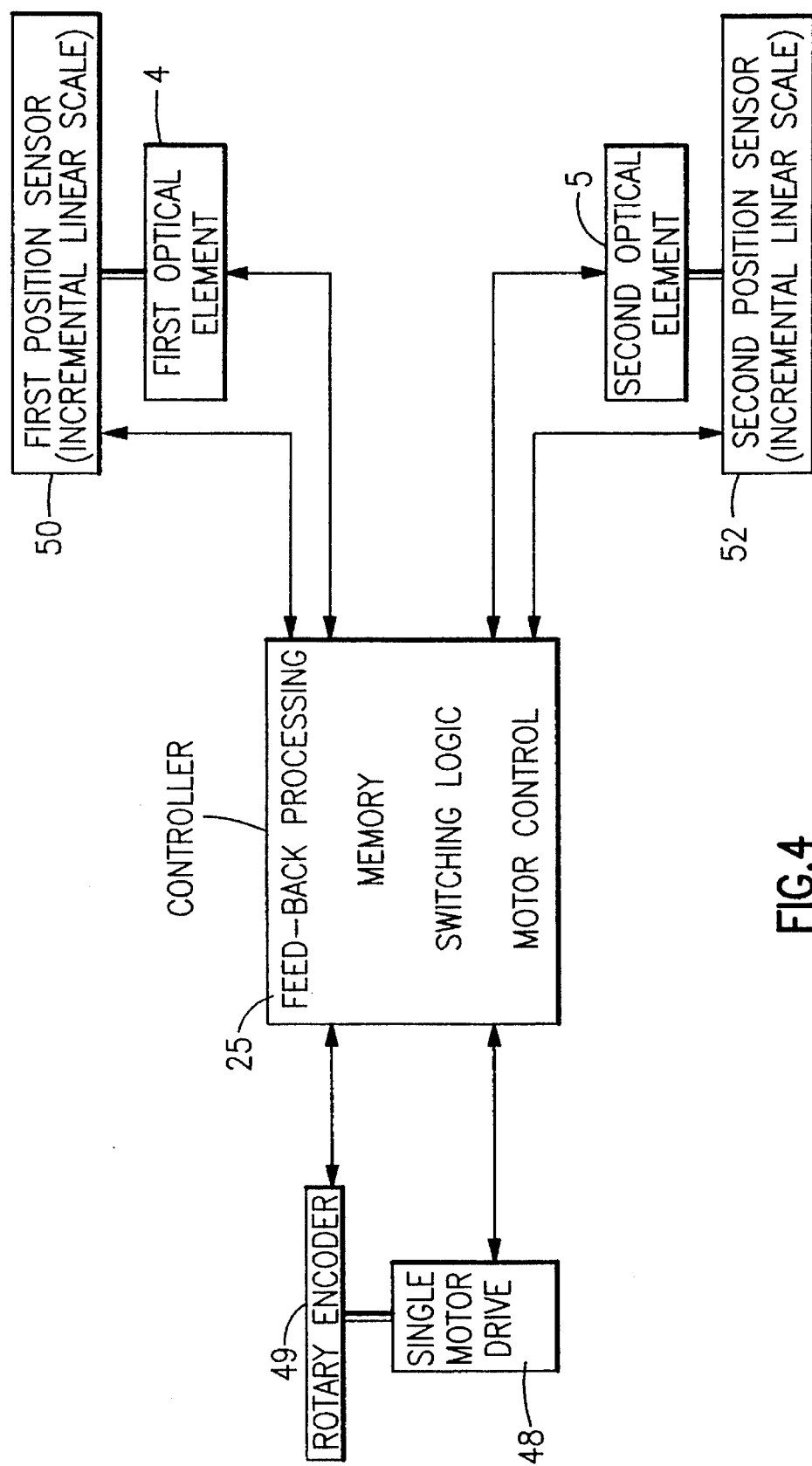
FIG. 4 shows a block diagram of the present invention.

In one embodiment shown in FIG. 1, the single optical element drive means 40 includes a single belt drive system 42 having a single belt 44 disposed on rollers 46 driven by a single motor drive 48, as shown in FIG. 4. The single motor drive 48 is a stepper motor although it could also be a constant RPM DC motor. The transmission belt 44 can be a stainless steel belt, a wire belt, or a polyamide film (i.e. Kapton).

As shown, the plurality of discrete optical elements 4,5 includes a first optical element 4 and a second optical element 5, which each include a respective lens 4a, 5a.

In the embodiment shown in FIG. 1, the selectively connecting means 10, 11, 20, 21 are piezoelectric transmission clamps 10, 11, 20, 21. The piezoelectric transmission clamps 10, 11 respectively have clamps 10a, 10b, 11a, 11b; and the piezoelectric transmission clamps 20, 21 respectively have clamps 20a, 20b, 21a, 21b, as shown.

In one embodiment, the belt 44 is arranged to slide between the clamps 10a, 10b, 20a, 20b for clasping and unclasping the belt 44 to connect and disconnect the first and second optical elements 4, 5 to the single optical drive means to The first and second optical elements 4, 5 may be separately or simultaneously connected to and disconnected from the belt 44, as discussed in more detail below with respect to FIG. 3. The optical apparatus 2 further includes guide rod means 30a, 30b, 30c. As shown, the first optical element 4 is slidably arranged to move on guide rods 30a, 30b, and the second optical element 5 is slidably arranged to move on guide rods 30b, 30c. The guide rod 3b is a common guide rod to both the first and second optical elements 4, 5. The guide rods 30a, 30b, 30c are arranged in parallel to ensure movement along the same optical path 3.

The first optical element 4 has an associated piezoelectric brake release 16 for cooperating with the guide rod 30a for holding it in a desired position, and the second optical element 5 has an associated piezoelectric brake release 26 for cooperating with the guide rod 30c for holding it in a desired position. FIG. 2 shows the piezoelectric release brake 26 and the guide rod 30c in a released relationship.

In operation, all moving lenses (i.e. zoom or focusing) are locked and held in position while the piezoelectric brakes 16, 26 are clamped against one of the guide rods 30a, 30b, 30c of the optical assembly 2. In this mode, the piezoelectric transmission clamps 10, 11, 20, 21 and piezoelectric release brakes 16, 26 are not energized. To change the focal length or magnification of the optical apparatus 2, the piezoelectric release brakes 16, 26 are released (energized) at the same time as the piezoelectric transmission clamps 10, 11, 20, 21 are engaged (energized), either against the upper or the lower side of the moving transmission belt. In principle, this system is similar to driving a stepper motor. The resolution can be programmed by varying the clamping frequency; as well, the acceleration, deceleration and distance traveled can be controlled by varying the duration of the clamping and unclamping.

FIG. 1 refers to a fixed focus (focus on infinity) zoom lens. As the focal length or magnification is changed of the zoom lens by the first zooming groups typically a large distant movement for example by the first optical element 4, the second zoom group for example the second optical element 5 is moved simultaneously in a lesser distance in order to keep the image plane on its position. In effect, the second optical element 5 functions as a focus compensator to keep the image plane in its position while the magnification is being changed by the optical element 4. This concept is discussed in more detail regarding FIG. 5.

FIGS. 3(a)–3(j) each show a diagram of the piezoelectric transmission clamps 10, 11, 20, 21 taken along section line 3—3 in FIG. 1. FIG. 3a shows the position of the clamps 10a, 10b, 11a, 11b, 20a, 20b, 21a, 21b in FIG. 1.

Figure 3B:
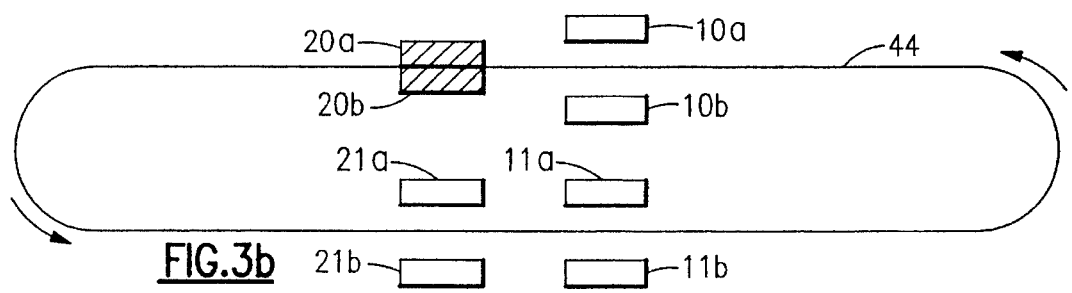

In order to move the second optical element 5 leftwardly as shown, the piezoelectric brake 22 is released and piezoelectric transmission clamp 20 is activated so clamps 20a, 20b clasp the belt 44 in the position shown in FIG. 3b. (Clamps that clasp the belt 44 are shown in hatched shading.)

Figure 3C:
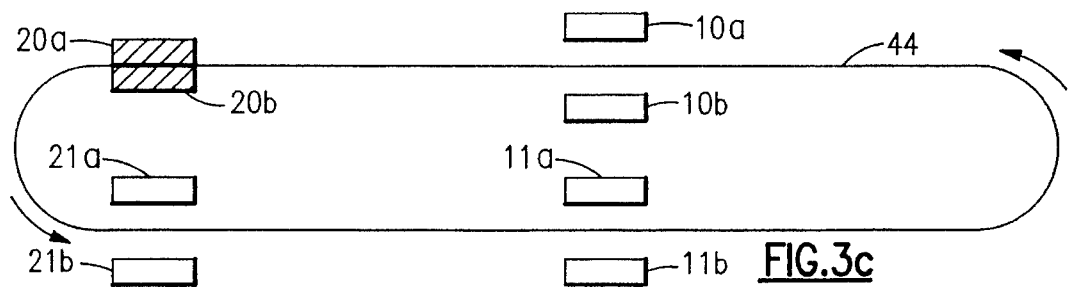
Figure 3D:
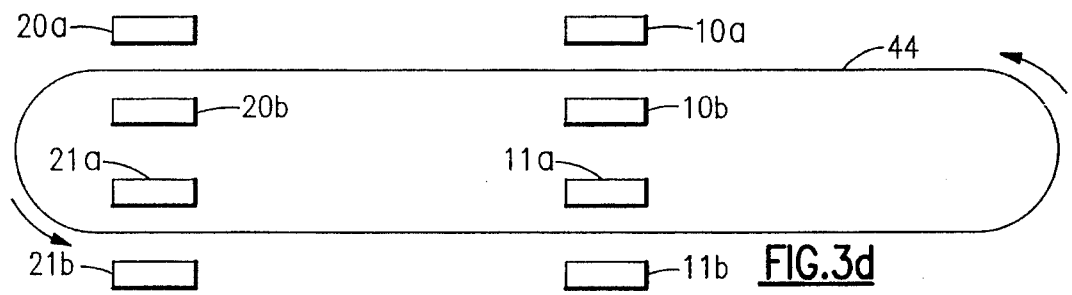

The piezoelectric transmission clamp 20 engages the belt 44 until the second optical element 5 reaches a desired position as shown in FIG. 3c, where the piezoelectric transmission clamp 20 is de-activated and clamps 20a, 20b release the belt 44 in the position shown in FIG. 3d. The piezoelectric brake release 22 is activated to hold the second optical element 5 in the desired position along guide rods 30b and 30c.

Figure 3E:
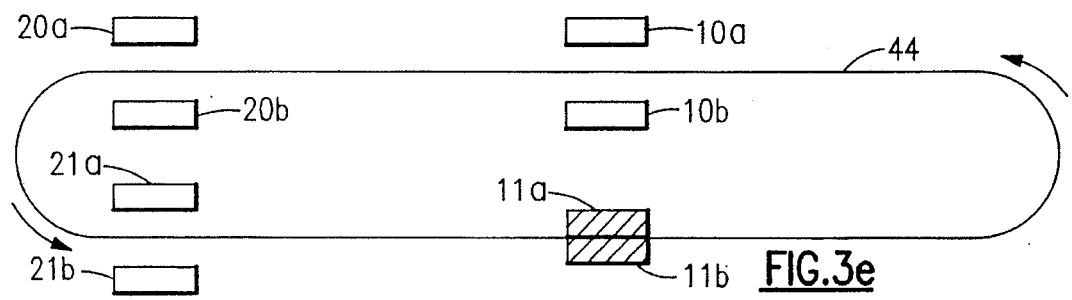

In order to move the first optical element 4 rightwardly, as shown, the piezoelectric brake 12 is released and piezoelectric transmission clamp 11 is actuated and clamps 11a, 11b clasp the belt 44 in the position shown in FIG. 3e.

Figure 3F:
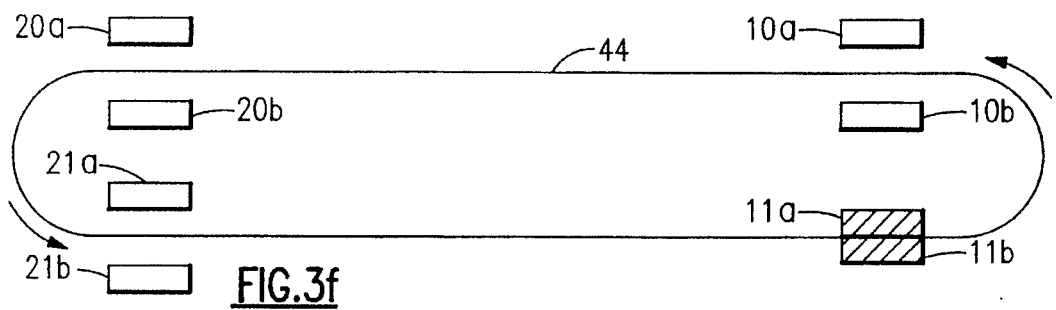
Figure 3G:
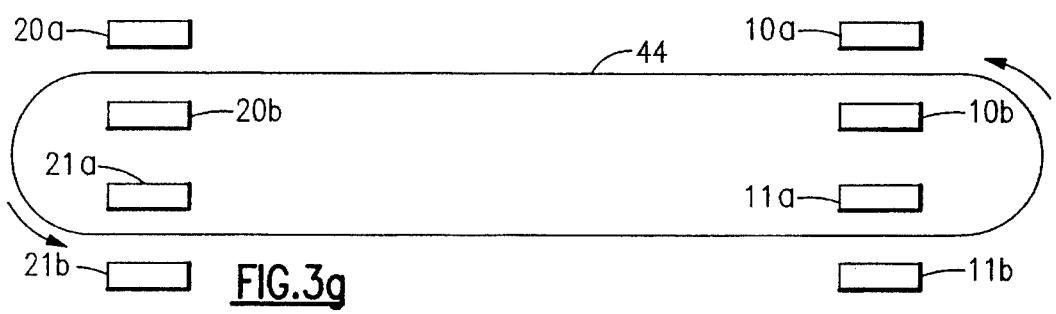

The piezoelectric transmission clamp 11 engages the belt 44 until the first optical element 4 reaches a desired position as shown in FIG. 3f, where the transmission clamp 11 is deactivated and clamps 11a, 11b release the belt 44 as shown in FIG. 3g. The piezoelectric brake release 12 is activated to hold the optical element in the desired position along guide rods 30a and 30b.

Figure 3H:
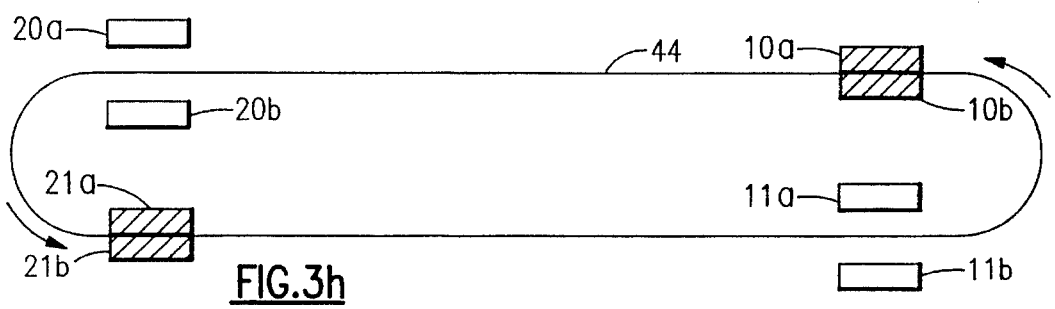
Figure 3I:
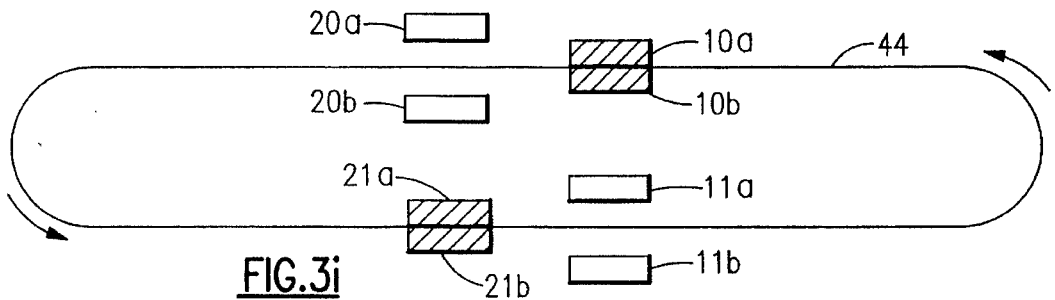
Figure 3J:
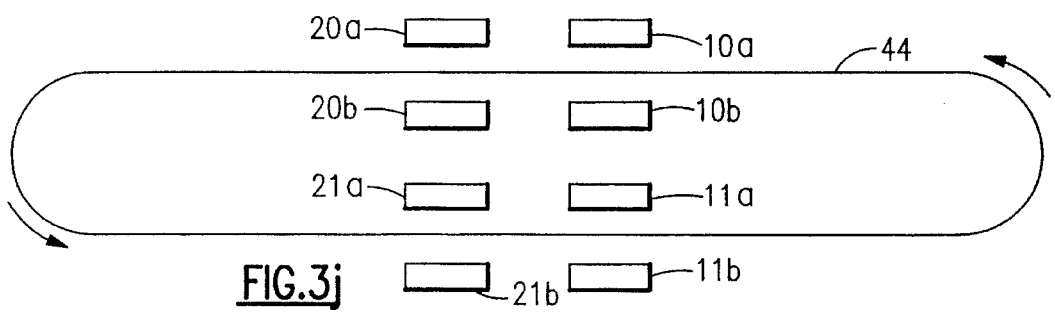

In order to move the first optical element 4 and the second optical element 5 simultaneously, the respective piezoelectric brakes 16, 26 are released and transmission clamps 10, 21 are engaged to hold the belt 44 with clamps 10a, 10b and 21a, 21b in the position shown in FIG. 3h. The piezoelectric transmission clamps 10, 21 engage the belt 44 until the first and second optical elements 4, 5 reach a desired position as shown in FIG. 3i, where the transmission clamps 10, 21 are deactivated as shown in FIG. 3j. The respective piezoelectric brake release is 12, 22 are activated to hold the optical element in this desired position.

As the main transmission belt 44 (FIG. 1) is being loaded and unloaded by the clamped and unclamped optical elements to the optical element drive means 40 the single motor drive 48 (FIG. 4) of the transmission 44 will be changing.

In order to maintain constant RPM of the drive motor 48, a rotary encoder 49 is mounted on the motor shaft (not shown) to provide feedback signals to the speed processing controller (not shown) of the motor 48.

Additionally, there is an incremental linear glass scale assembly 50, 52 provided for each discrete optical element group for supplying feed-back information to the controller 25 as shown in FIG. 4.

The incremental position sensors 50, 52 generate up-down pulses for a position counter (not shown) in the controller 25, which reads and compares them with a set of values stored in the memory (not shown) of the controller 25 as positional data, and the difference will actuate the servo loop (not shown) in the controller 25. The piezoelectric transmission clamps 10, 11, 20, 21 and brakes 16, 26 are driven by this system.

As shown in FIG. 5 (a) through 5(g), the optical apparatus 2 is a zoom lens having a first zooming group 100 and a second zooming group 200. The first zooming group 100 changes the magnification by adjusting the focal length, while the second zooming group 200 functions as a focus compensator to keep the image plane I on its position. The first zooming group 100 includes a plurality of optical lens 102, 104, 106, while the second zooming group 200 includes a plurality of optical lens 202, 204. FIGS. 5(a) through (g) show the movement of the first and second zoom groups 100 and 200. There is only a very slight movement of the second zoom group 200 in order to compensate for the focus length change. Normally if the first zoom group 100 moves 35 millimeters the second zoom group 200 will move about 1.2 millimeters. The movement between the first and second zoom group 100 and 200 is not a linear relationship. Note that, as shown, the zoom lens in focused on infinity, and also includes a third lens group 300, including optical lens 302, 304, 306, which can also be made movable so the "object distance" can be changed and the zoom lens can be focused on different objects at different distances from the camera. Between the second zoom group 200 and the image plane I is an optical train 400 having a group of lens for compensating for errors in lens distortion, coloration and astigmatism, which are well-known in the art.

The invention has important applications for zoom lens, and may also be broadly applied to any optical instrument where multiple components have to be positioned with respect to each other either simultaneously or individually. For example, in its broadest sense the optical apparatus 2 will include the plurality of discrete optical elements 4, 5, each being disposed along the common optical path 3; and the means 40, associated with the plurality of optical elements 4, 5, for simultaneously coupling one or more of the plurality of optical elements 4, 5 to move along the common optical path 3 to change the focal length and magnification of the optical apparatus 2, as shown in FIG. 1.

Although the present invention has been described herein with respect to one or more embodiments, it will be understood that other arrangements and configurations can be made by those skilled in the art without departing from the spirit and scope of the invention. Hence, the present invention is deemed limited only by the following claims and the reasonable interpretation thereof.

What is claimed is:

1. An optical apparatus, comprising:
   a plurality of discrete optical elements, each optical element being disposed along a common optical path;
   a single drive member and
   an engagable member associated with each discrete optical element to selectively connect to said single drive member,
   said plurality of discrete optical elements being movable along said common optical path of the optical apparatus; and
   said engagable member including at least one piezoelectric transmission clamp for coupling a respective one of said plurality of discrete optical elements to said single drive member.

2. An optical apparatus according to claim 1, wherein the single drive member comprises a belt driven by a motor.

3. An optical apparatus according to claim 2, wherein the motor comprises a stepper motor.

4. An optical apparatus according to claim 2, wherein the motor comprises a constant RPM DC motor monitored by a coupled rotary encoder.

5. An optical apparatus according to claim 2, wherein the belt comprises a stainless steel belt.

6. An optical apparatus according to claim 2, wherein the belt comprises a wire belt.

7. An optical apparatus according to claim 2, wherein the belt comprises a Kapton polyamide belt.

8. An optical apparatus according to claim 2, wherein the belt comprises a synthetic fiber.

9. An optical apparatus according to claim 1, wherein each of the plurality of discrete optical elements includes at least one lens.

10. An optical apparatus according to claim 1, wherein the optical apparatus further includes a guide member, each of said plurality of discrete optical elements being slidably arranged on said guide member.

11. An optical apparatus according to claim 10, wherein the guide member includes at least one common guide rod on which all of said plurality of discrete optical elements are slidably arranged.

12. An optical apparatus according to claim 10, wherein the guide member comprises at least one rod.

13. An optical apparatus according to claim 1, wherein each of said discrete optical elements also includes at least one piezoelectric brake release holding said discrete optical elements in a desired position on guide member.

14. An optical apparatus according to claim 1, wherein said apparatus further includes optical incremental position sensors to detect said plurality of discrete optical elements.

15. An optical apparatus according to claim 1, wherein said apparatus further includes a controller in communication with said engagable member, the engagable member capable of clamping the drive member .

16. An optical apparatus according to claim 15, wherein the clamping frequency of the engagable member is capable of being varied.

17. An optical apparatus according to claim 15, wherein the duration of the clamping and unclamping of the engagable member is capable of being varied and the drive member is capable of being accelerated and decelerated to control said plurality of discrete optical elements along the common optical path.

18. An optical apparatus according to claim 1, wherein the optical apparatus is a zoom lens.

19. An optical apparatus according to claim 1, wherein the engagable member comprises a clamp.

20. An optical apparatus, comprising a plurality of lenses, each lens being disposed along a common optical path;

a single drive member;

a plurality of engagable members coupling each said lens to said drive member; and a plurality of piezoelectric brake releases capable of holding each said lens in a desired position.

* * * * *